(12) United States Patent
Chang et al.

(10) Patent No.: US 9,563,093 B2
(45) Date of Patent: Feb. 7, 2017

(54) LIQUID CRYSTAL DISPLAY INCLUDING CURVED SHIELD ELECTRODE

(71) Applicant: Samsung Display Co., Ltd., Yongin, Gyeonggi-Do (KR)

(72) Inventors: Hak Sun Chang, Yongin-si (KR); Ka Eun Kim, Yongin-si (KR); Jang Wi Ryu, Seoul (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 151 days.

(21) Appl. No.: 14/530,934

(22) Filed: Nov. 3, 2014

(65) Prior Publication Data

US 2015/0323845 A1    Nov. 12, 2015

(30) Foreign Application Priority Data

May 8, 2014  (KR) ........................ 10-2014-0055072

(51) Int. Cl.
  *G02F 1/1368*  (2006.01)
  *G02F 1/1362*  (2006.01)
  *G02F 1/1343*  (2006.01)

(52) U.S. Cl.
  CPC ........... *G02F 1/1362* (2013.01); *G02F 1/1343* (2013.01); *G02F 1/1368* (2013.01); *G02F 1/13624* (2013.01); *G02F 1/136286* (2013.01); *G02F 2001/134345* (2013.01); *G02F 2001/136218* (2013.01)

(58) Field of Classification Search
  CPC .............. G02F 1/1362; G02F 1/136286; G02F 2001/134345; G02F 2001/136218
  See application file for complete search history.

(56) References Cited

U.S. PATENT DOCUMENTS

| 2012/0105785 A1* | 5/2012 | Kim | .................... G09G 3/3648 349/139 |
| 2013/0083263 A1* | 4/2013 | Kim | .................. G02F 1/134336 349/38 |

* cited by examiner

*Primary Examiner* — Tracie Y Green
(74) *Attorney, Agent, or Firm* — Cantor Colburn LLP

(57) ABSTRACT

A liquid crystal display includes a lower substrate and an upper substrate facing each other, a liquid crystal layer provided between the lower substrate and the upper substrate, a plurality of pixel electrodes provided on the lower substrate, extended in a substantially horizontal direction, and including a thin film transistor forming region and a display area, a reference voltage line extended in a substantially vertical direction along a center of the display area, a gate line provided on the lower substrate and extended in the substantially horizontal direction between neighboring pixel electrodes of the plurality of pixel electrodes, a data line provided on the lower substrate and crossing the gate line, and a shield electrode overlapping the gate line and including a curved portion which is disposed on an edge portion of the pixel electrode and overlaps the data line.

14 Claims, 8 Drawing Sheets

FIG. 6
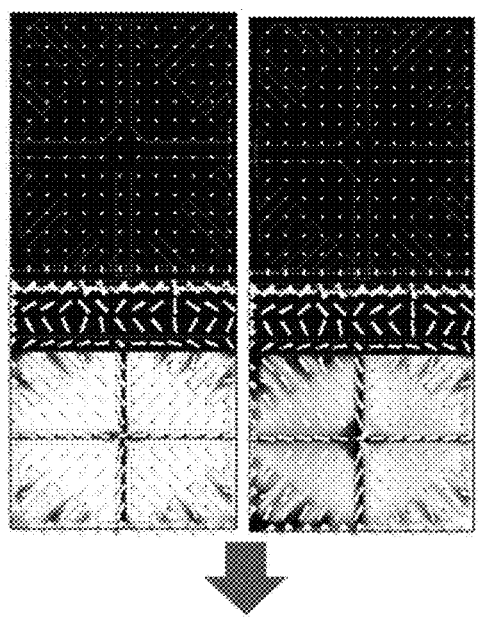
(a) Existing_ BM y-axis -4um
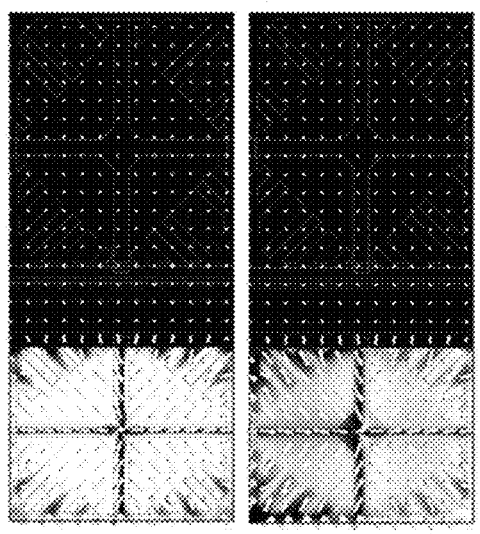
(b) Apply shield electrode_ BM y-axis -4um FIG. 7
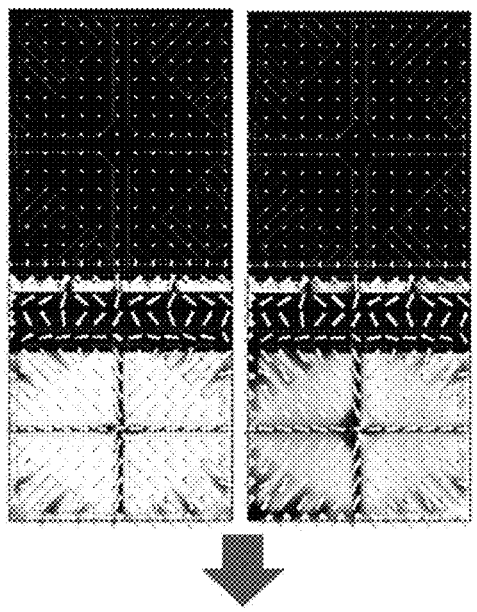
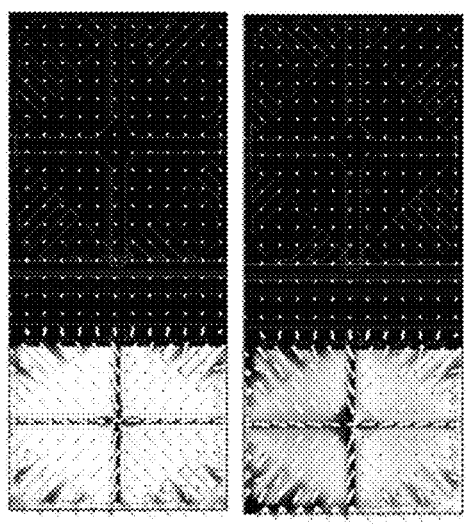

FIG. 8
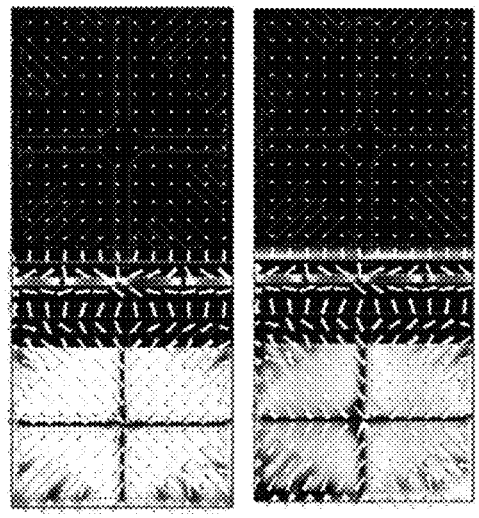
(a) Existing_ BM y-axis -6um GATE LINE +3um
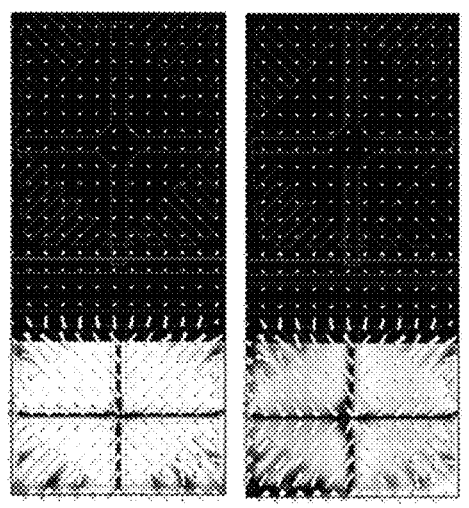
(b) Apply shield electrode_ BM y-axis -6um GATE LINE +3um

LIQUID CRYSTAL DISPLAY INCLUDING CURVED SHIELD ELECTRODE

This application claims priority to Korean Patent Application No. 10-2014-0055072 filed on May 8, 2014, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD"), which is one of the most common types of flat panel displays currently in use, includes two sheets of display panels with field generating electrodes such as a pixel electrode, a common electrode, and the like, and a liquid crystal layer interposed therebetween. The LCD generates an electric field in the liquid crystal layer by applying a voltage to the field generating electrodes to determine alignment of liquid crystal molecules of the liquid crystal layer through the generated electric field and control polarization of incident light, thereby displaying images.

The LCD includes a switching element connected to the pixel electrode, a plurality of signal lines such as a gate line and a data line for controlling the switching element and applying a voltage to the pixel electrode, and a driver for applying a driving signal to the signal line and driving a display panel.

The driver includes a gate driver for supplying a gate signal including a gate-on voltage or a gate-off voltage to the gate line of the display panel, a data driver for supplying a data signal to the data line of the display panel, and a signal controller for controlling the data driver and the gate driver.

Among the LCDs, a vertical alignment ("VA") mode LCD, which aligns LC molecules such that their long axes are perpendicular to the display panels in the absence of an electric field, is spotlighted because of its high contrast ratio and wide reference viewing angle.

In the VA mode LCD, a wide viewing angle that is an important characteristic may be realized by forming cutouts such as minute slits, or protrusions, in the field-generating electrodes. Since the cutouts and protrusions may determine the tilt directions of the LC molecules, the tilt directions may be distributed in various directions by using the cutouts and protrusions such that the reference viewing angle is widened.

SUMMARY

When a gate-off voltage as a gate signal is applied to a gate line, charges may be piled on a boundary of a pixel because of a relatively large voltage difference between a common electrode and the gate line applied to the gate signal, and a light leakage fault may occur on the boundary of the pixel by electric field caused by the piled charges induced by the gate line applied with the gate signal.

When defining minute slits in a pixel electrode to have a plurality of branch electrodes, a liquid crystal is splay-arranged by an electric field generated by the gate signal in addition to minute slits of the pixel electrode, which causes a light leakage fault between the pixels.

The invention has been made in an effort to provide a liquid crystal display ("LCD") for preventing a light leakage fault between pixels induced by an electric field of a gate signal.

The invention has been made in another effort to improve transmittance of a LCD.

An exemplary embodiment of the invention provides a LCD including a lower substrate and an upper substrate facing each other, a liquid crystal layer provided between the lower substrate and the upper substrate, a plurality of pixel electrodes provided on the lower substrate, extended in a substantially horizontal direction, and including a thin film transistor ("TFT") forming region and a display region, a reference voltage line extended in a substantially vertical direction along a center of the display region, a gate line provided on the lower substrate and extended in the substantially horizontal direction between neighboring pixel electrodes of the plurality of pixel electrodes, a data line provided on the lower substrate and crossing the gate line, and a shield electrode overlapping the gate line and including a curved portion which is disposed on an edge portion of the pixel electrode and overlaps the data line.

In an exemplary embodiment, the shield electrode may be separated from the plurality of pixel electrodes.

In an exemplary embodiment, the reference voltage line may include a branch extended in the TFT forming region along an outer side of the display region.

In an exemplary embodiment, a contact hole may be defined between the branch and the shield electrode, and connects the branch and the shield electrode.

In an exemplary embodiment, the plurality of pixel electrodes may include a first sub-pixel region and a second sub-pixel region respectively arranged in two rows.

In an exemplary embodiment, each of the first sub-pixel region and the second sub-pixel region may include six domains.

In an exemplary embodiment, the reference voltage line may cross centers of the first sub-pixel region and the second sub-pixel region.

In an exemplary embodiment, each of the first sub-pixel region and the second sub-pixel region may include a plurality of unit electrodes connected to each other.

In an exemplary embodiment, a unit electrode of the plurality of unit electrodes may include a center electrode having a plate-shaped configuration and a plurality of minute branches extended from a side of the center electrode.

In an exemplary embodiment, an area of a unit electrode of the plurality of unit electrodes of the second sub-pixel region may be equal to or greater than an area of a unit electrode of the first sub-pixel region.

In an exemplary embodiment, a voltage applied to the second sub-pixel region may be less than a voltage applied to the first sub-pixel region.

In an exemplary embodiment, the plurality of pixel electrodes further includes a first sub-pixel electrode and a second sub-pixel electrode, and the TFT forming region includes a first TFT connected to the first sub-pixel electrode of the plurality of pixel electrodes of the first sub-pixel region, a second TFT connected to the second sub-pixel electrode of the plurality of pixel electrodes of the second sub-pixel region, and a third TFT connected to the reference voltage line.

In an exemplary embodiment, an upper common electrode is provided on the upper substrate.

In an exemplary embodiment, a horizontal opening, a perpendicular opening crossing the horizontal opening, and a cross opening configured with the horizontal opening and the perpendicular opening may be defined in the upper common electrode.

In addition to the technical object of the invention, other characteristics and advantages of the invention will be described hereinafter, and will be clearly understood by a person skilled in the art in the technical field to which the invention belongs.

According to one or more embodiment of the invention, the light leakage fault between the pixels induced by the electric field of the gate signal may be prevented.

According to one or more embodiment of the invention, transmittance of the LCD may be increased and the outer side space of the pixel electrode may be obtained by reducing the light blocking member ("BM") for blocking light leakage on the outer side of the pixel electrode.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 6 shows a light leakage preventing effect of an exemplary embodiment of a LCD according to the invention.

FIG. 7 shows a light leakage preventing effect of an exemplary embodiment of a LCD according to the invention.

FIG. 8 shows a light leakage preventing effect of an exemplary embodiment of a LCD according to the invention.

DETAILED DESCRIPTION

Figure 1:
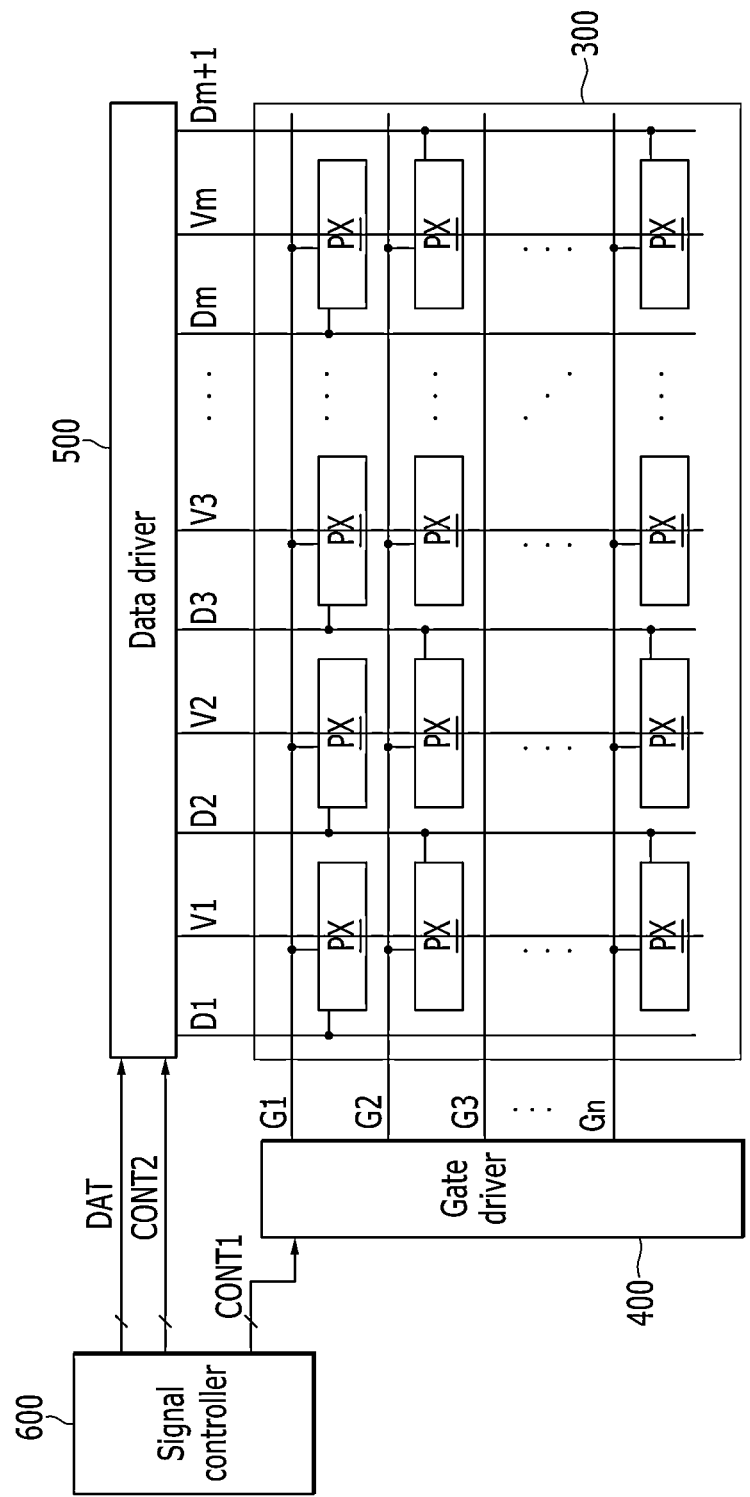
FIG. 1 shows a block diagram of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A display device according to an exemplary embodiment of the invention will now be described in detail with reference to FIG. 1.

FIG. 1 shows a block diagram of a display device according to an exemplary embodiment of the invention.

As shown in FIG. 1, the display device includes a display panel 300 for displaying an image, a data driver 500 and a gate driver 400 for driving the display panel 300, and a signal controller 600 for controlling the data driver 500 and the gate driver 400.

The display panel 300 includes a plurality of gate lines (G1-Gn) and a plurality of data lines (D1-Dm+1). The gate lines (G1-Gn) are extended in the substantially horizontal direction, and the data lines (D1-Dm+1) cross the gate lines (G1-Gn) in an insulated manner and are extended in the substantially vertical direction. Further, each of reference voltage lines (V1-Vm) extended in the substantially vertical direction is provided between adjacent data lines of the plurality of data lines (D1-Dm+1). The reference voltage lines (V1-Vm) cross the gate lines (G1-Gn) in an insulated manner.

A gate line and a data line are connected to a pixel PX. The pixels PX are arranged in a matrix form and are provided in the substantially horizontal direction which is an extended direction of the gate lines (G1-Gn) and substantially horizontal direction which is an extended direction of the data lines (D1-Dm+1). In an exemplary embodiment, the pixel PX may include a thin film transistor ("TFT"), a liquid crystal capacitor, and a storage capacitor, for example. The TFT includes a control terminal connected to one of the gate lines (G1-Gn), an input terminal connected to one of the data lines (D1-Dm+1), and an output terminal connected to a first terminal (e.g., pixel electrode) of the liquid crystal capacitor and a first terminal of the storage capacitor. A second terminal of the liquid crystal capacitor is connected to a common electrode, and a second terminal of the storage capacitor receives a storage voltage. In other exemplary embodiment, a channel layer of the TFT may be amorphous silicon, polysilicon, or an oxide semiconductor. The reference voltage lines (V1-Vm) provide a reference voltage to the pixels PX. The reference voltage has a voltage level that is invariable with respect to time. However, in other exemplary embodiment, the reference voltage may have a variable voltage level.

In the liquid crystal display ("LCD") according to an exemplary embodiment of the invention, a data line is alternately connected to the pixels PX provided on the right and the left. That is, when connected to the pixel PX provided on the right in the first row, it is connected to the pixel PX provided on the left in the second row, and it is connected to the pixel PX provided on the right in the third row. A single gate line is connected to the pixels PX in one row.

According to the above-noted configuration, an odd pixel disposed in odd rows and an even pixel disposed in even rows belonging to one pixel column are connected to different data lines, and when the data lines (D1-Dm+1) apply the data voltage with a same polarity for one frame, polarity inversion displayed to the pixel PX is shown as dot inversion.

In an exemplary embodiment, the number of the data lines (D1-Dm+1) may be greater than the number (m) of the pixel columns by one. In the exemplary embodiment of FIG. 1, a pixel column is not provided on the left of the first data line D1 so that the first data line D1 is alternately connected to the pixels in the column provided on the right of the first data line D1, and a pixel column is not provided on the right of the (m+1)th data line Dm+1 so that the (m+1)th data line Dm+1 is alternately connected to the pixels in the same column provided on the left of the (m+1)th data line Dm+1.

The signal controller 600 processes a signal corresponding to an operating condition of the liquid crystal panel 300 in response to input data input from an external device, and control signals of the signal controller 600 such as a vertical synchronization signal, a horizontal synchronizing signal, a main clock signal, and a data enable signal, and generates and outputs image data DAT, a gate control signal CONT1, a data control signal CONT2, and a clock signal.

The gate control signal CONT1 may include a scanning start signal for instructing an output start of the gate-on voltage and a gate clock signal for controlling an output time of the gate-on voltage.

The data control signal CONT2 may include a horizontal synchronization start signal for instructing an input start of the image data DAT and a load signal for applying a data voltage to the data lines (D1-Dm+1).

A plurality of gate lines (G1-Gn) of the display panel 300 is connected to the gate driver 400, and the gate-on voltage is sequentially applied to the gate driver 400 according to the gate control signal CONT1 provided by the signal controller 600.

The gate-off voltage is applied the gate lines (G1-Gn) in a section in which the gate-on voltage is not applied thereto.

A plurality of data lines (D1-Dm+1) of the display panel 300 is connected to the data driver 500, and the data driver 500 receives the data control signal CONT2 and the image data DAT from the signal controller 600. The data driver 500 uses a gray voltage generated by a gray voltage generator (not shown) to convert the image data DAT into a data voltage which is then transmitted to the data lines (D1-Dm+1). The data voltage includes a data voltage with positive polarity and a data voltage with negative polarity. In an exemplary embodiment, the data voltage with positive polarity and the data voltage with negative polarity are alternately applied with respect to a frame, a row, or a column, thereby inversely driven. In the exemplary embodiment, the inverse driving is applicable to displaying of moving or still images.

In other exemplary embodiments, various pixel connection structures that are not shown in FIG. 1 are allowable.

A configuration of two adjacent pixel regions of a pixel PX will be described with reference to FIG. 2.

Figure 2:
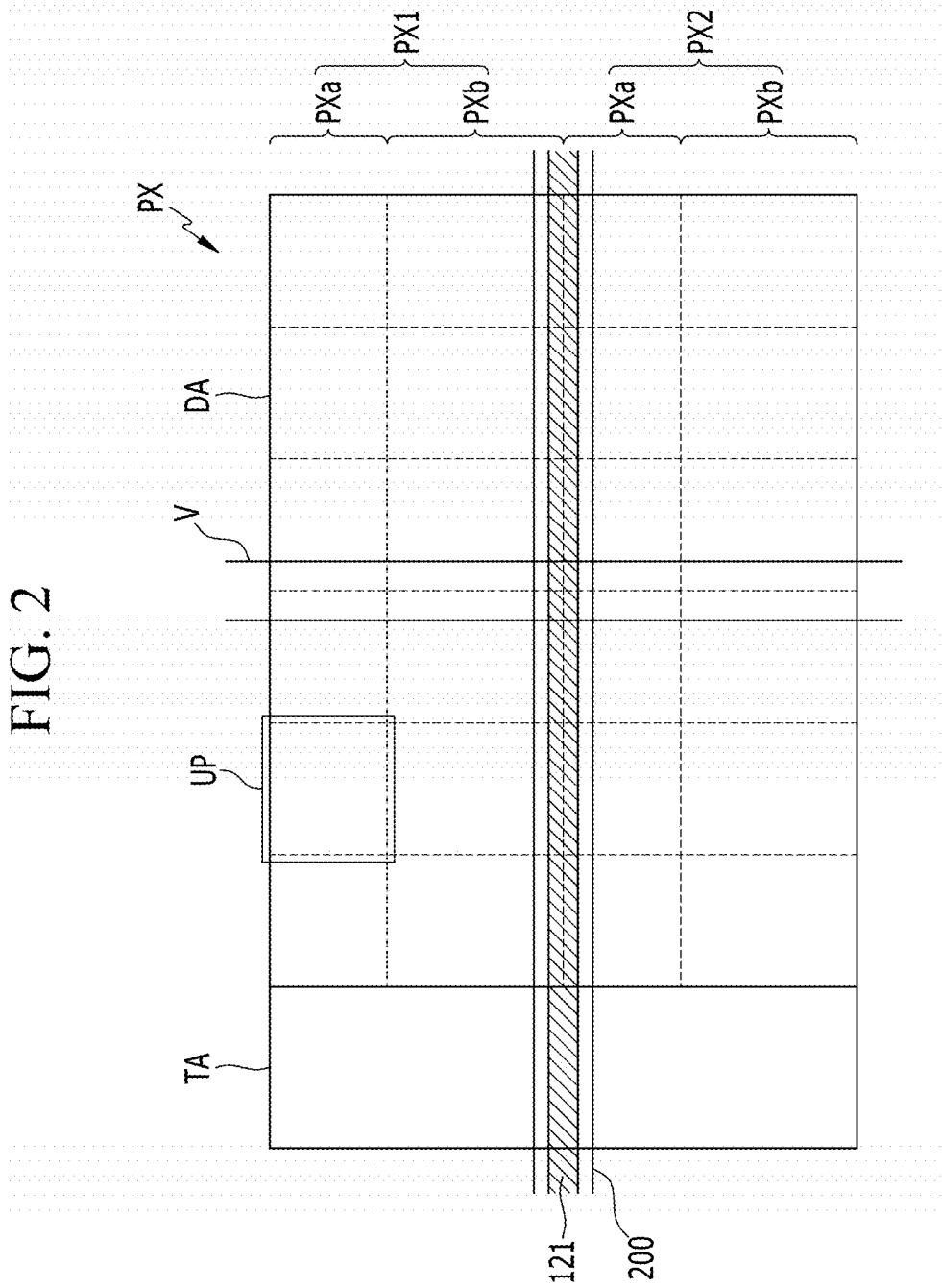
FIG. 2 shows a plan view of an exemplary embodiment of two adjacent pixels according to the invention.

FIG. 2 shows a plan view of two adjacent pixels according to an exemplary embodiment of the invention.

The pixel PX includes two pixel regions PX1 and PX2 including horizontal pixels that are extended in the horizontal direction and arranged in the vertical direction. Further, the pixel PX includes a TFT forming area TA and a display area DA. A pixel electrode is provided in the display region DA and displays an image through liquid crystal molecules provided in the display area DA. Elements such as a TFT and wires for transmitting a voltage to be applied to the pixel electrode of the display area DA are provided in the TFT forming region TA.

A reference voltage line V is provided in the substantially vertical direction along the center of the display area DA on the pixel PX according to the exemplary embodiment of FIG. 2. One of the pixel regions PX1 and PX2 includes a first sub-pixel region PXa and a second sub-pixel region PXb respectively arranged in two rows.

In an exemplary embodiment, the first sub-pixel region PXa and the second sub-pixel region PXb respectively include six domains. The domains are distinguished with dotted lines in FIG. 2. That is, one of the pixel regions PX1 and PX2 includes twelve domains. The reference voltage line V is provided to halve the twelve domains. That is, the reference voltage line V is provided to cross the middle of the first sub-pixel region PXa and the second sub-pixel region PXb.

The first sub-pixel region PXa and the second sub-pixel region PXb respectively include six unit electrodes UP corresponding to six domains. In an exemplary embodiment, the area of the unit electrode UP of the second sub-pixel region PXb may be equal to or greater than the area of the unit electrode of the first sub-pixel region PXa. In an exemplary embodiment, the voltage applied to the second sub-pixel region PXb may be less than the voltage applied to the first sub-pixel region PXa.

The gate line 121 is extended in the substantially horizontal direction between the two adjacent pixel regions PX1 and PX2. In detail, the gate line 121 is extended in the substantially horizontal direction between the second sub-pixel region PXb of the pixel region PX1 and the first sub-pixel region PXa of the other adjacent pixel region PX2.

An electric field of the gate signal is generated by the gate line 121 for transmitting the gate signal. Liquid crystal on the gate line 121 is splay-arranged by the electric field of the gate signal. Resultantly, light leakage faulty may be generated between the two pixel regions PX1 and PX2. However, the LCD according to an exemplary embodiment of the invention provides a shield electrode 200 on the gate line 121 so as to shield the electric field of the gate signal.

A configuration of a pixel electrode and a reference voltage line V in a pixel PX according to an exemplary embodiment of the invention will now be described with reference to FIG. 3.

Figure 3:
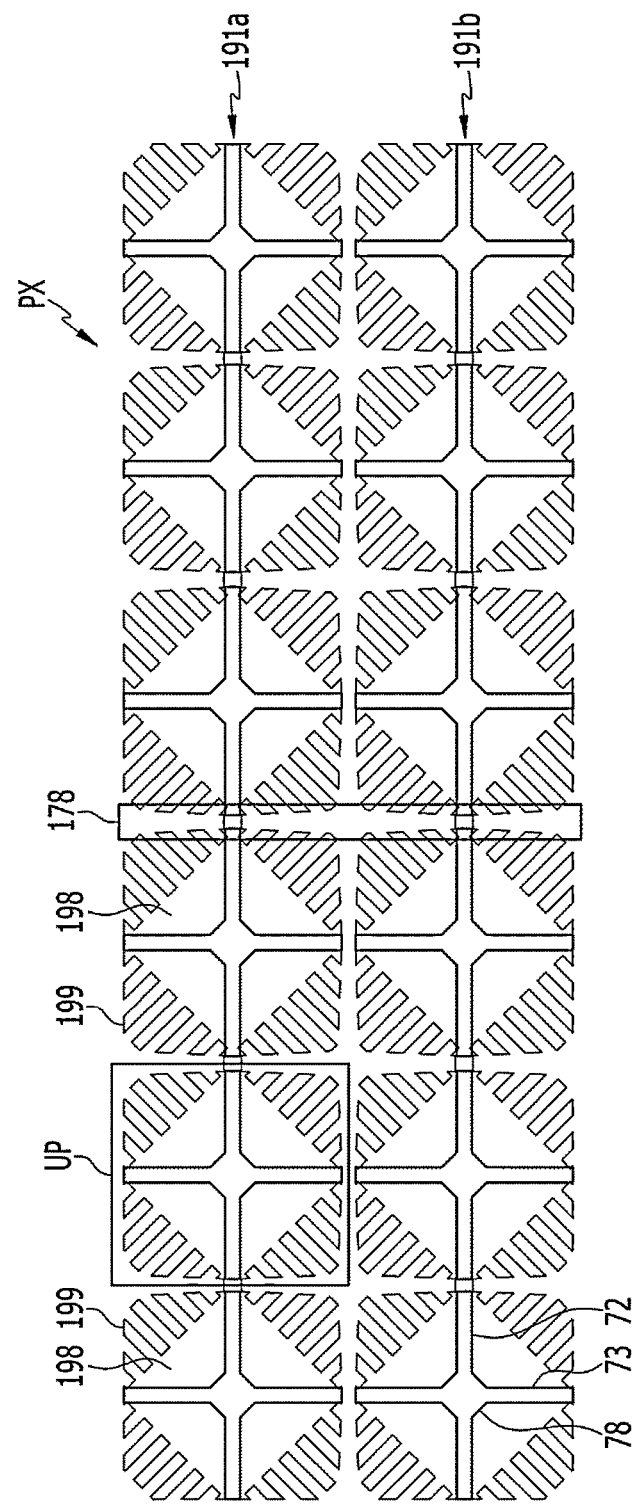
FIG. 3 shows a plan view of an exemplary embodiment of a pixel electrode and its periphery according to the invention.

FIG. 3 shows a plan view of a pixel electrode and its periphery according to an exemplary embodiment of the invention.

The pixel electrode provided in the pixel PX includes a first sub-pixel electrode 191a that is a pixel electrode of the first subpixel and a second sub-pixel electrode 191b that is a pixel electrode of the second subpixel.

The first sub-pixel electrode 191a and the second sub-pixel electrode 191b respectively include six unit pixel electrodes UP corresponding to six domains, and each unit pixel electrode UP includes a center electrode 198 and a plurality of minute branches 199 extended outwardly from a side of the center electrode 198. The minute branches 199 may define an angle of about 45 degrees with respect to the substantially horizontal direction or the substantially vertical direction, and the angle may be between about 40 degrees and about 50 degrees. The side of the center electrode 198 may be orthogonal to the minute branch 199. Control of the liquid crystal is reinforced through a fringe field caused by an edge of the center electrode 198 to further increase transmittance of the LCD.

The six unit pixel electrodes of the first sub-pixel electrode 191a and the second sub-pixel electrode 191b are connected to each other through an extension. In the exemplary embodiment of FIG. 3, the center electrode 198 defines a side of the unit pixel electrode UP. However, the invention is not limited thereto, and the center electrode 198 may be spaced apart from the side of the unit pixel electrode UP, and the minute branch 199 may be provided at (e.g., define) an edge of the unit pixel electrode UP. The extension of the unit pixel electrode UP, that is, the maximum dimension our outermost edges may be defined by the center electrode 198 or the minute branch 199. The six unit pixel electrodes UP connected by the extension receive the same voltage. In an exemplary embodiment, unit pixel electrodes UP belonging to the first sub-pixel electrode 191a may be connected to each other through an extension, and unit pixel electrodes UP belonging to the second sub-pixel electrode 191b may be connected to each other through an extension. In an exemplary embodiment, unit pixel electrodes UP belonging to the first sub-pixel electrode 191a may be separated from unit pixel electrodes UP belonging to the second sub-pixel electrode 191b.

Openings 72, 73, and 78 that are domain dividing means are defined in an upper common electrode of one domain region in which the unit pixel electrode UP is provided. That is, a cross opening configured with a horizontal opening 72 and a perpendicular opening 73 crossing the horizontal opening 72 is defined in the upper common electrode, and in the exemplary embodiment, a center opening 78 may be provided in the center of the cross opening. In an exemplary embodiment, the center opening 78 may have a polygonal configuration including four linear sides that are provided in four sub-regions divided by the cross opening, and the center opening 78 may have a rhombus configuration in the exemplary embodiment.

A reference voltage line 178 extended along a substantially vertical direction is provided to cross the centers of the first sub-pixel electrode 191a and the second sub-pixel electrode 191b.

An entire configuration of a pixel having the configuration of a pixel electrode, a common electrode, and a reference voltage line will now be described with reference to FIG. 4.

Figure 4:
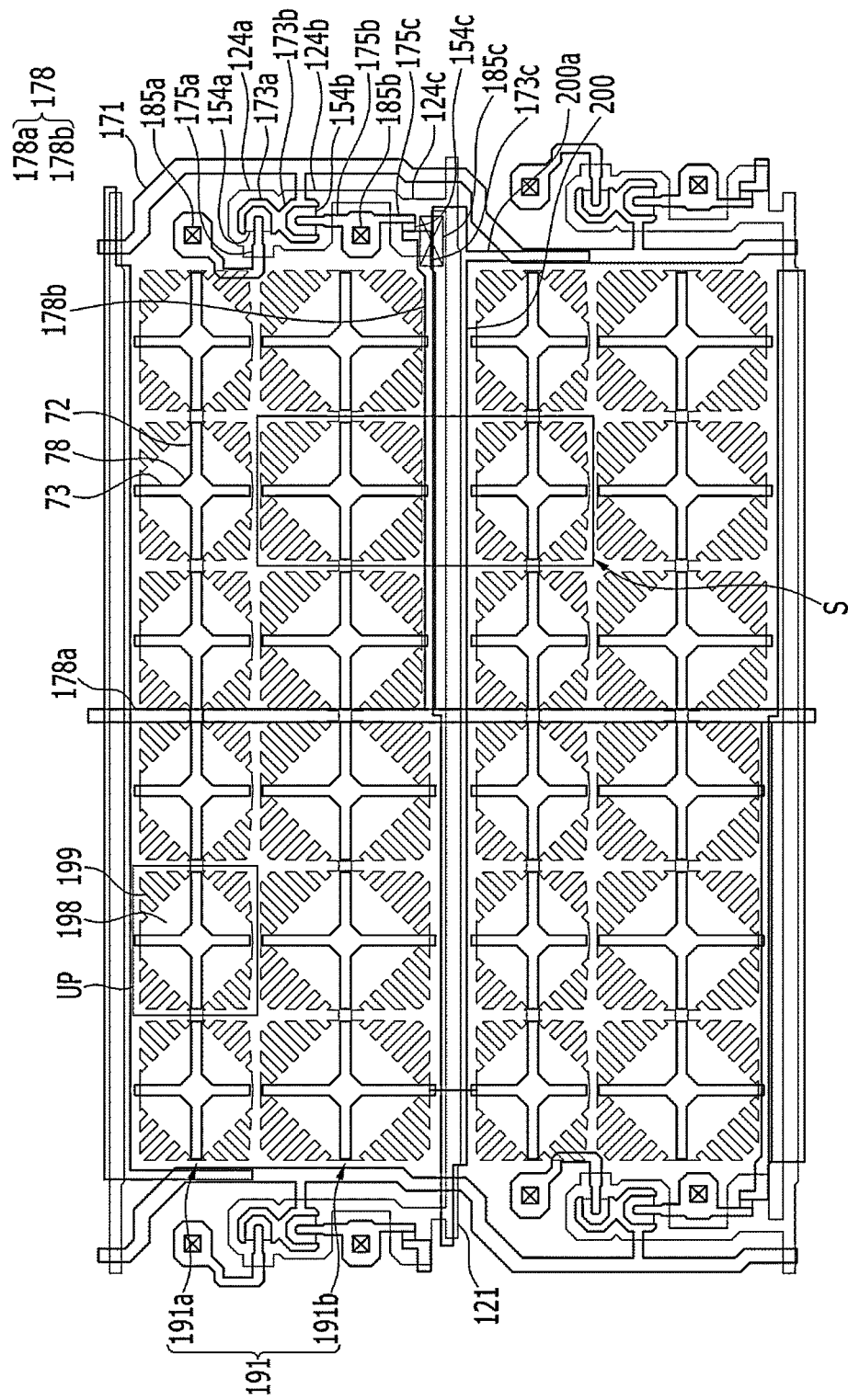
FIG. 4 shows a plan view of an exemplary embodiment of two adjacent pixels of a liquid crystal display ("LCD") according to the invention.
Figure 5:
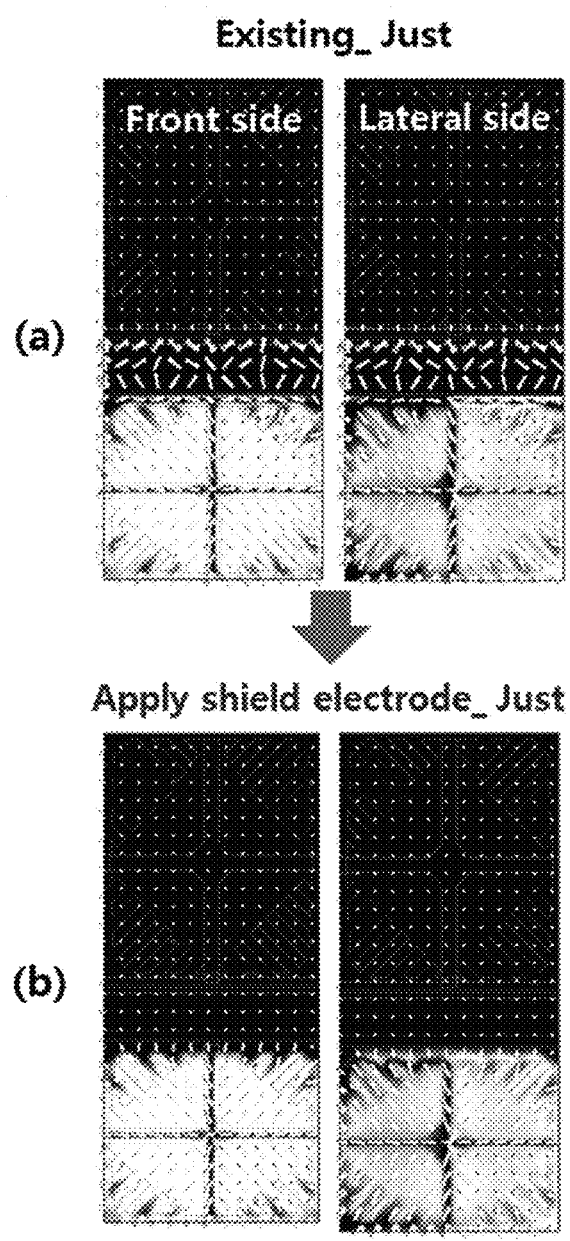
FIG. 5 shows a light leakage preventing effect of an exemplary embodiment of a LCD according to the invention.

FIG. 4 shows a detailed configuration of a pixel according to an exemplary embodiment of the invention of FIG. 3, showing a plan view of two adjacent pixels of a LCD according to an exemplary embodiment of the invention.

Referring to FIG. 4, the LCD includes a lower panel and an upper panel facing each other, and a liquid crystal layer provided between the two display panels.

In the lower panel, a plurality of gate lines 121 is provided on the lower substrate.

The gate line 121 is extended in the substantially horizontal direction between a plurality of pixel electrodes 191, and includes a first gate electrode 124a, a second gate electrode 124b, and a third gate electrode 124c extended and protruded upward from the gate line 121. In an exemplary embodiment, the first gate electrode 124a, the second gate electrode 124b, and the third gate electrode 124c are extended upward from on a main line of the gate line 121 substantially extended in the substantially horizontal direction so that the third gate electrode 124c is extended from the main line of the gate line 121, and the first gate electrode 124a and the second gate electrode 124b are extended from the third gate electrode 124c. In an exemplary embodiment, the first gate electrode 124a and the second gate electrode 124b may be provided in one expanded region. In an exemplary embodiment, the gate line 121 may include a curved portion that is periodically curved on the main line of the gate line 121 substantially extended in the substantially horizontal direction.

A gate insulating layer may be provided on the gate line 121, and a first semiconductor 154a, a second semiconductor 154b, and a third semiconductor 154c may be provided on the first gate electrode 124a, the second gate electrode 124b, and the third gate electrode 124c, respectively.

A data conductor including a data line 171, a first drain electrode 175a, a second drain electrode 175b, a third source electrode 173c, a third drain electrode 175c, and a reference voltage line 178 is provided on the first semiconductor 154a, the second semiconductor 154b, the third semiconductor 154c, and the gate insulating layer.

The data line 171 transmits the data voltage and is extended in the substantially vertical direction to cross the gate line 121 on the lower substrate. The data line 171 includes a first source electrode 173a and a second source electrode 173b extended toward the first and second gate electrodes 124a and 124b.

In an exemplary embodiment, the reference voltage line 178 may include a main line 178a parallel to the data line 171 and a branch 178b extending from the main line 178a and approximately parallel to the gate line 121. In the exemplary embodiment, the branch 178b extends to a TFT forming area TA along an outer side of the display area, and one end of the branch provides the third drain electrode 175c.

The first drain electrode 175a faces the first source electrode 173a, the second drain electrode 175b faces the second source electrode 173b, and the third drain electrode 175c faces the third source electrode 173c. The third drain electrode 175c is connected to the second drain electrode 175b.

The first gate electrode 124a, the first source electrode 173a, and the first drain electrode 175a provide a first TFT along with the first semiconductor 154a, the second gate electrode 124b, the second source electrode 173b, and the second drain electrode 175b provide a second TFT along with the second semiconductor 154b, and the third gate electrode 124c, the third source electrode 173c, and the third drain electrode 175c provide a third TFT along with the third semiconductor 154c. That is, the data voltage is applied to the source electrode of the first TFT and the second TFT, but the reference voltage is applied to the source electrode of the third TFT.

A passivation layer is positioned on the data conductor, and a pixel electrode is positioned thereon.

A single pixel electrode 191 includes a first sub-pixel electrode 191a and a second sub-pixel electrode 191b as described with reference to FIG. 3.

The first drain electrode 175a of the first TFT is connected to the first sub-pixel electrode 191a through a first contact hole 185a.

The second drain electrode 175b of the second TFT is connected to the second sub-pixel electrode 191b through a second contact hole 185b.

The shield electrode 200 is provided on the gate line 121 and is provided to overlap the gate line 121. That is, the shield electrode 200 is extended in the substantially horizontal direction to overlap the gate line 121 between the two neighboring pixel electrodes 191.

The shield electrode 200 is separated from the pixel electrode 191, and is connected to the branch 178b of the reference voltage line 178 through a contact hole 185c. That is, the contact hole 185c is provided between the shield electrode 200 and the branch 178b of the reference voltage line 178 and connects the shield electrode 200 and the reference voltage line 178. As a result, a voltage supplied by the reference voltage line 178 is applied to the shield electrode 200.

According to conventional art, the gate line 121 is provided between the neighboring pixel electrodes 191, and when a gate-off voltage is applied to the gate line 121, charges are piled on the boundary of the pixel PX because of a large voltage difference between the common electrode and the gate line 121, and a light leakage fault may occur on the boundary of the pixel PX by the electric field caused by the piled charges.

However, according to an exemplary embodiment of the invention, the electric field caused by the gate-off voltage is blocked by providing the shield electrode 200 connected to the reference voltage line 178 on the gate line 121 so as to shield the electric field induced by the gate line 121, and the phenomenon in which liquid crystal is splayed between the pixel electrodes 191 disappears, thereby preventing the light leakage fault.

The shield electrode 200 may include a curved portion 200a that is curved on an edge portion of the pixel electrode 191. The curved portion 200a may be disposed on the data line 171 to overlap the data line 171 in order to shield the electric field occurring between the pixel electrode 191 and the data line 171.

According to conventional art, the curved portion of the shield electrode is provided between the first sub-pixel electrode 191a and the data line 171 so as to shield the electric field caused by the piled charges induced by the data line 171 applied with the data signal.

According to conventional art, a light blocking member (not shown) for blocking light leakage on the outer side of the pixel electrode 191 must be provided to the data line and the curved portion of the shield electrode in the prior art. However, in the exemplary embodiment, the curved portion 200a is provided to overlap the data line 171 so that the light blocking member for blocking light leakage on the outer side of the first sub-pixel electrode 191a may be reduced and while still providing a light blocking member to the data line, to increase transmittance of the LCD and maximize a space between the outer side and the first sub-pixel electrode 191a according to an exemplary embodiment of the invention.

Although not shown, in upper panel, a color filter and a light blocking member may be provided on an upper substrate.

The light blocking member is also referred to as a black matrix and prevents light leakage between the pixel electrodes 191. In an exemplary embodiment, the light blocking member may cover most of the data line 171, the gate line 121, and the TFT.

In an exemplary embodiment, the color filter may display one of three primary colors such as red, green, and blue. According to another exemplary embodiment of the invention, at least one of the light blocking member and the color filter may be provided on a lower panel.

In an exemplary embodiment, an overcoat may be provided on the color filter and the light blocking member, and an upper common electrode may be provided on the overcoat. Openings 72, 73, and 78 may be defined in the upper common electrode for receiving the common voltage as shown in FIG. 3. In other exemplary embodiments, a protrusion may be provided instead of the openings of the upper common electrode and may be used as a domain dividing means.

In an exemplary embodiment, the liquid crystal layer provided between the lower panel and the upper panel includes liquid crystal molecules having negative dielectric anisotropy. In an exemplary embodiment, a long axis of the liquid crystal molecules may be aligned to be perpendicular to the surface of the two display panels while electric field is not generated.

A region S will be simulated in various circumstances as described below with reference to FIGS. 5(a) to 8(b).

A light leakage preventing effect of a LCD according to an experimental example of the invention will be described with reference to FIGS. 5(a) to 8(b).

FIGS. 5(a) to 8(b) show a light leakage preventing effect of a LCD according to an exemplary embodiment of the invention, showing a simulation drawing on the region S shown in FIG. 4. A left view in each Figure is of a Front side and a right view in each Figure is of a Lateral side of the LCD.

FIGS. 5(a), 6(a), 7(a) and 8(a) show a LCD according to conventional art (Existing), where FIG. 5(a) shows an application of a connection film connected to a second sub-pixel electrode 191b on the gate line 121 (Just) between the pixel electrodes 191, and FIGS. 6(a), 7(a) show an arrangement of liquid crystal when the connection film and the light blocking member (BM) are moved below the y axis, and 8(a) show an arrangement of liquid crystal when the connection film and the light blocking member (BM) are moved below the y axis and gate line is moved above the y axis. The connection film and the light blocking member are disposed below the y axis by about minus 4 micrometers (um) in FIG. 6(a) and by about minus 6 um in FIGS. 7(a) and 8(a), and the gate line is disposed above the y axis by about plus 3 micrometers (um) in FIG. 8(a).

Referring to FIGS. 5(a), 6(a), 7(a) and 8(a), it is found that the liquid crystal provided between the pixel electrodes undergoes the splay alignment phenomenon. That is, the LCD according to conventional art generates a splay alignment phenomenon so light leakage occurs on a front side and a lateral side.

In contrast, FIGS. 5(b), 6(b), 7(b) and 8(b) show an arrangement of liquid crystal between the pixel electrodes when a shield electrode is applied between the pixel electrodes in a LCD according to an embodiment of the invention.

Referring to FIGS. 5(b), 6(b), 7(b) and 8(b), it is found that the liquid crystal provided between the pixel electrodes does not show the splay alignment phenomenon. That is, the LCD removes the phenomenon of splaying the liquid crystal between the pixel electrodes to prevent the light leakage fault on the front side and the lateral side. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a lower substrate and an upper substrate facing each other;
    a liquid crystal layer provided between the lower substrate and the upper substrate;
    a plurality of pixel electrodes provided on the lower substrate, extended in a substantially horizontal direction, and including a thin film transistor forming region and a display area;
    a reference voltage line extended in a substantially vertical direction along a center of the display area;
    a gate line provided on the lower substrate and extended in the substantially horizontal direction between neighboring pixel electrodes of the plurality of pixel electrodes;
    a data line provided on the lower substrate and crossing the gate line; and
    a shield electrode overlapping the gate line and including a curved portion which is disposed on an edge portion of the pixel electrode and overlaps the data line,
    wherein the shield electrode has different thicknesses along the vertical direction.

2. The liquid crystal display of claim 1, wherein the shield electrode is separated from the plurality of pixel electrodes.

3. The liquid crystal display of claim 1, wherein the reference voltage line includes a branch extended in the thin film transistor forming region along an outer side of the display area.

4. The liquid crystal display of claim 3, further comprising:
    a contact hole defined between the branch and the shield electrode, and connecting the branch and the shield electrode.

5. The liquid crystal display of claim 1, wherein the plurality of pixel electrodes includes a first sub-pixel region and a second sub-pixel region respectively arranged in two rows.

6. The liquid crystal display of claim 5, wherein each of the first sub-pixel region and the second sub-pixel region includes six domains.

7. The liquid crystal display of claim 6, wherein the reference voltage line crosses centers of the first sub-pixel region and the second sub-pixel region.

8. The liquid crystal display of claim 7, wherein each of the first sub-pixel region and the second sub-pixel region includes a plurality of unit electrodes connected to each other.

9. The liquid crystal display of claim 8, wherein a unit electrode of the plurality of unit electrodes includes a center electrode having a plate-shaped configuration and a plurality of minute branches extended from a side of the center electrode.

10. The liquid crystal display of claim 8, wherein an area of a unit electrode of the plurality of unit electrodes of the second sub-pixel region is equal to or greater than an area of a unit electrode of the plurality of unit electrodes of the first sub-pixel region.

11. The liquid crystal display of claim 5, wherein a voltage applied to the second sub-pixel region is less than a voltage applied to the first sub-pixel region.

12. The liquid crystal display of claim 5, wherein the plurality of pixel electrodes further includes a first sub-pixel electrode and a second sub-pixel electrode, and the thin film transistor forming region includes:
    a first thin film transistor connected to the first sub-pixel electrode of the plurality of pixel electrodes of the first sub-pixel region;
    a second thin film transistor connected to the second sub-pixel electrode of the plurality of pixel electrodes of the second sub-pixel region; and
    a third thin film transistor connected to the reference voltage line.

13. The liquid crystal display of claim 1, wherein an upper common electrode is provided on the upper substrate.

14. The liquid crystal display of claim 13, wherein a horizontal opening, a perpendicular opening crossing the horizontal opening, and a cross opening configured with the horizontal opening and the perpendicular opening are defined in the upper common electrode.

* * * * *